(12) United States Patent
Seldin et al.

(10) Patent No.: US 8,220,023 B2
(45) Date of Patent: Jul. 10, 2012

(54) METHOD FOR CONTENT PRESENTATION

(75) Inventors: Yevgeny Seldin, Jerusalem (IL); Asher Sterkin, Jerusalem (IL)

(73) Assignee: NDS Limited, Staines, Middlesex (GB)

( * ) Notice: Subject to any disclaimer, the term of this patent is extended or adjusted under 35 U.S.C. 154(b) by 359 days.

(21) Appl. No.: 12/448,388

(22) PCT Filed: Feb. 21, 2007

(86) PCT No.: PCT/IL2007/000237
§ 371 (c)(1), (2), (4) Date: Sep. 21, 2009

(87) PCT Pub. No.: WO2008/102331
PCT Pub. Date: Aug. 28, 2008

(65) Prior Publication Data
US 2010/0050211 A1    Feb. 25, 2010

(51) Int. Cl.
*G06F 3/00*    (2006.01)
*G06F 13/00*    (2006.01)
*H04N 5/445*    (2011.01)

(52) U.S. Cl. ............... 725/47; 725/44; 725/45; 725/46; 725/52

(58) Field of Classification Search ................... None
See application file for complete search history.

(56) References Cited

U.S. PATENT DOCUMENTS

| | | | |
|---|---|---|---|
| 5,758,259 A | 5/1998 | Lawler | |
| 5,778,362 A | 7/1998 | Deerwester | |
| 6,133,909 A | 10/2000 | Schein et al. | |
| 6,334,127 B1 | 12/2001 | Bieganski et al. | |
| 6,727,914 B1 | 4/2004 | Gutta | |
| 6,934,964 B1 | 8/2005 | Schaffer et al. | |
| 7,089,236 B1 | 8/2006 | Stibel | |
| 7,228,556 B2 | 6/2007 | Beach et al. | |
| 2003/0093792 A1 | 5/2003 | Labeeb et al. | |
| 2003/0233655 A1 | 12/2003 | Gutta et al. | |
| 2003/0236708 A1 | 12/2003 | Marsh | |
| 2004/0003401 A1 | 1/2004 | Gutta et al. | |
| 2005/0172317 A1 | 8/2005 | Jeong et al. | |

FOREIGN PATENT DOCUMENTS

| | | |
|---|---|---|
| EP | 1 300 781 A2 | 4/2003 |
| EP | 1 400 903 A1 | 3/2004 |
| EP | 1 424 640 A2 | 6/2004 |
| EP | 1 494 144 A2 | 1/2005 |
| EP | 1 538 838 A1 | 6/2005 |
| EP | 1 906 317 A2 | 4/2008 |
| GB | 2 343 075 A | 4/2000 |
| WO | WO 94/14284 | 6/1994 |
| WO | WO 99/01984 | 1/1999 |
| WO | WO 00/04708 | 1/2000 |
| WO | WO 01/60064 A2 | 8/2001 |
| WO | WO 02/25938 A2 | 3/2002 |
| WO | WO 03/077112 A1 | 9/2003 |

(Continued)

OTHER PUBLICATIONS

Nov. 22, 2010 Office Communication in connection with prosecution of EP 07 71 3263.7.

(Continued)

*Primary Examiner* — Joseph P Hirl
*Assistant Examiner* — Fred Peng
(74) *Attorney, Agent, or Firm* — Husch Blackwell LLP

(57) ABSTRACT

A method and system is presented for personalizing an electronic program guide that enables a viewer easily and quickly to access to the subset of information that is personally most relevant.

13 Claims, 10 Drawing Sheets

FOREIGN PATENT DOCUMENTS

| WO | WO 2004/047446 A1 | 6/2004 |
| WO | WO 2007/026357 A2 | 3/2007 |

OTHER PUBLICATIONS

Notification of Transmittal of the International Search Report and the Written Opinion of the International Searching Authority for the captioned application.

Chris Anderson, "The Long Tail," (available at www.wired.com/wired/archive/12.10/tail_pr.htlm).

Igor Cadez et al., "Model-Based Clustering and Visualization of Navigation Patterns on a Web Site," Technica l Report MSR-TR-00-18 (Microsoft Corp., Sep. 2001).

Nir Friedman et al., "Multivariate Information Bottleneck," (Proc. Of the $17^{th}$ Conf. on Uncertainty in artificial Intelligence (NIPS-14), 2002).

Jonathan L. Herlocker et al., "Evaluating Collaborative Filtering Recommender Systems," (ACM Transactions on Information Systems, vol. 22, No. 1, pp. 5-53, Jan. 2004).

Sara C. Madeira et al., "Biclustering Algorithms for Biological Data Analysis: A Survey," (IEEE/ACM Transactions on Computational Biology and Bioinformatics, vol. 1, Issue 1, Jan. 2004).

Noam Slonim et al., "Multivariate Information Bottleneck," Neural Computation 18, 1739-1789 (Massachusetts Institute of Technology, 2006).

Noam Slonim et al., "The Power of Word Clusters for Text Classification," (Proceedings of the $23^{rd}$ European Colloquium on Information Retrieval Research, 2001).

Noam Slonim et al., "Unsupervised Document Classification Using Sequential Information Maximization," (Proceedings of the $25^{th}$ ACM International Conference on Research and Development of Information Retrieval, SIGIR 2002, Tampere, Finland).

Naftali Tishby et al., "The Information Bottleneck Method" (Proceedings of the $37^{th}$ Annual Conference on Communication, Control, and Computing, 1999).

"Amazon.com," Page3s relating to online shopping available at www.amazon.com/gp/homepage.html/103-6536179-1932612.

"Yahoo! Shopping," A page relating to online shopping available at http//shopping.yahoo.com/.

"Shopping.com," Pages on the worldwide web relating to online shopping.

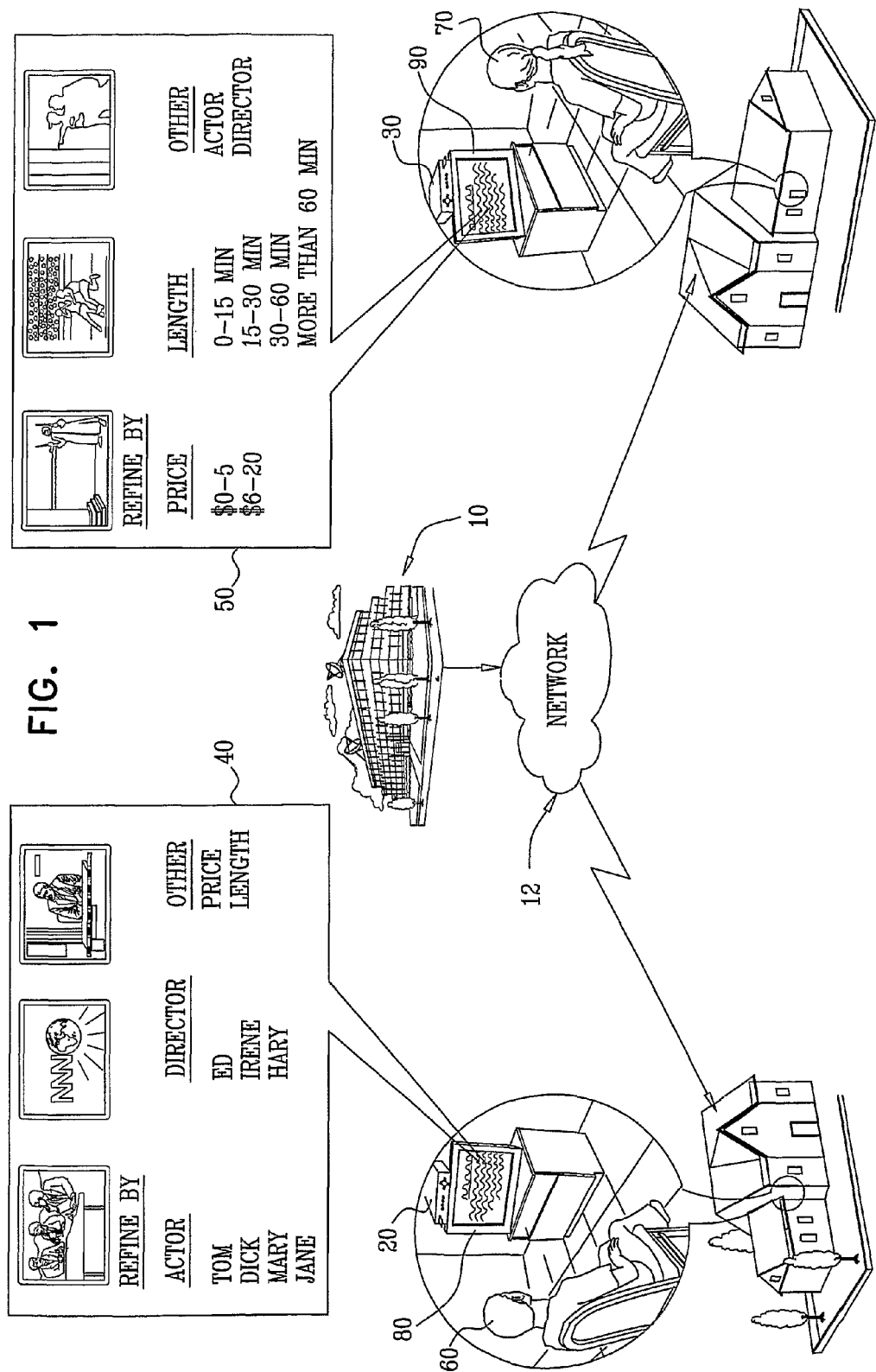

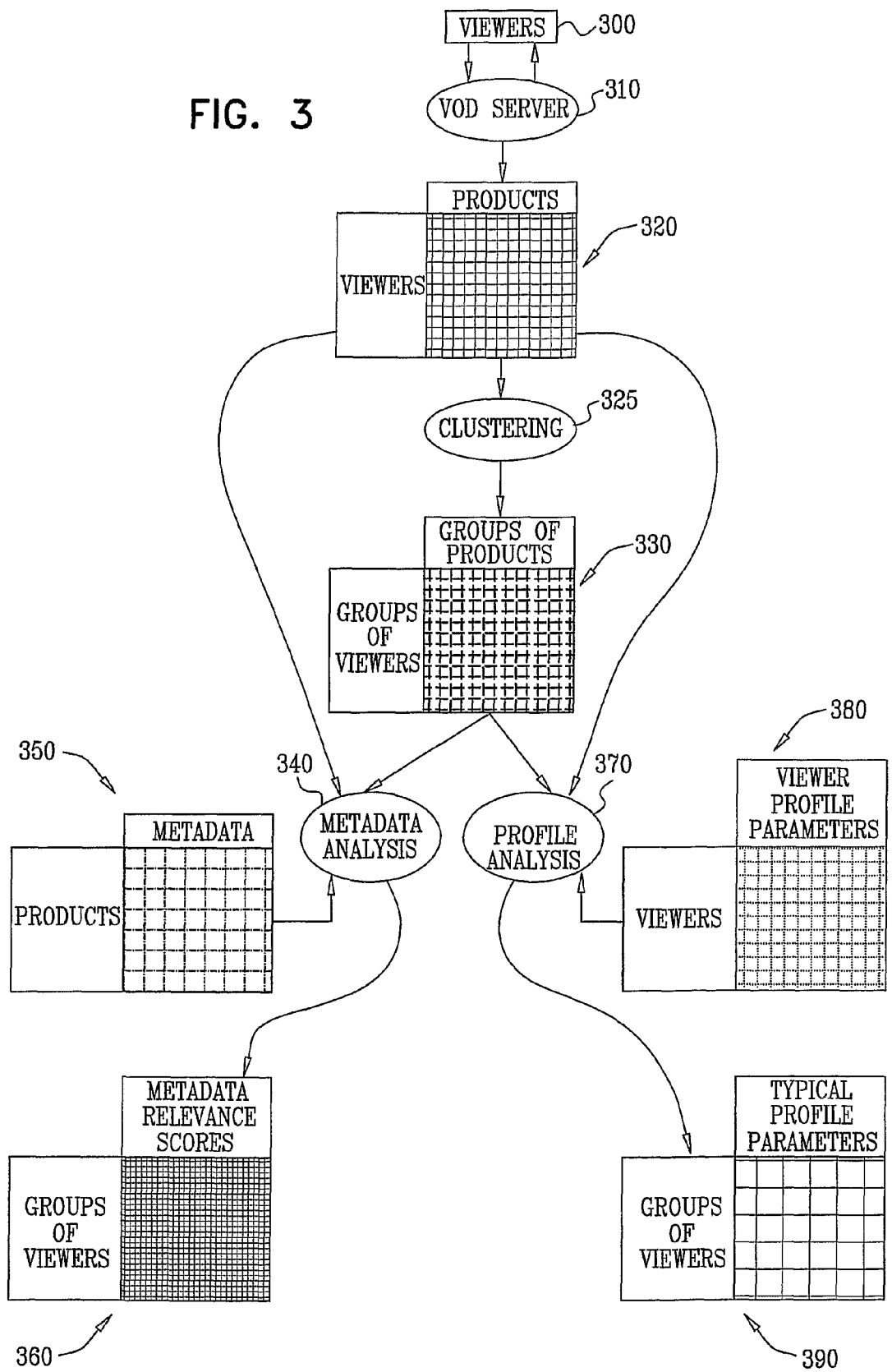

FIG. 7A

ESTABLISH A FIRST MATRIX POPULATED BY RATINGS ASSOCIATED WITH A FIRST PLURALITY OF V VIEWERS IN A CONTENT DISTRIBUTION SYSTEM AND A SECOND PLURALITY OF P PRODUCTS EACH OF WHICH IS A CONTENT ITEM, THE FIRST MATRIX HAVING DIMENSIONS V AND P, EACH ENTRY IN THE FIRST MATRIX COMPRISING EITHER AN EMPTY ENTRY OR A RATING INDICATING VIEWER INTEREST IN A CONTENT ITEM

↓

BI-CLUSTER THE FIRST MATRIX, THEREBY PRODUCING A SECOND MATRIX, THE SECOND MATRIX COMPRISING A MATRIX OF RATINGS COMPRISING A GROUPING OF THE VIEWERS ACCORDING TO SIMILARITY OF PRODUCTS CHOSEN BY THE VIEWERS AND A GROUPING OF THE PRODUCTS ACCORDING TO SIMILARITY OF VIEWERS WHO VIEWED THE PRODUCTS

↓

SCORE METADATA COMPONENTS ASSOCIATED WITH THE PRODUCTS ACCORDING TO THE MATRIX OF RATINGS AND PRODUCE A RESULTANT SCORE FOR EACH METADATA COMPONENT

↓

ESTABLISH, BASED AT LEAST IN PART ON THE SCORE FOR EACH METADATA COMPONENT, A THIRD MATRIX, THE THIRD MATRIX COMPRISING A MATRIX OF GROUPS OF VIEWERS ACCORDING TO METADATA SCORES

↓

ESTABLISH AN AUXILIARY MATRIX OF VIEWERS ACCORDING TO VIEWER PROFILE PARAMETERS, EACH ENTRY IN THE AUXILIARY MATRIX INDICATING A VIEWER PROFILE OF AN ASSOCIATED VIEWER AND COMPRISING A PARTICULAR VIEWER PROFILE PARAMETER

↓

GROUP TOGETHER MATRIX ENTRIES OF VIEWERS WITH SIMILAR VIEWER PROFILE PARAMETERS IN THE AUXILIARY MATRIX, THEREBY PRODUCING A FOURTH MATRIX, THE FOURTH MATRIX COMPRISING A MATRIX OF GROUPS OF VIEWERS ACCORDING TO VIEWER PROFILE PARAMETERS

ESTABLISH A FIRST MATRIX POPULATED BY RATINGS ASSOCIATED WITH A FIRST PLURALITY OF V VIEWERS IN A CONTENT DISTRIBUTION SYSTEM AND A SECOND PLURALITY OF P PRODUCTS EACH OF WHICH IS A CONTENT ITEM, THE FIRST MATRIX HAVING DIMENSIONS V AND P, EACH ENTRY IN THE FIRST MATRIX COMPRISING EITHER AN EMPTY ENTRY OR A RATING INDICATING VIEWER INTEREST IN A CONTENT ITEM

↓

BI-CLUSTER THE FIRST MATRIX, THEREBY PRODUCING A SECOND MATRIX, THE SECOND MATRIX COMPRISING A MATRIX OF RATINGS COMPRISING A GROUPING OF THE VIEWERS ACCORDING TO SIMILARITY OF PRODUCTS CHOSEN BY THE VIEWERS AND A GROUPING OF THE PRODUCTS ACCORDING TO SIMILARITY OF VIEWERS WHO VIEWED THE PRODUCTS

↓

ASSOCIATE VIEWERS INTO GROUPS OF VIEWERS BASED ON THE VIEWER GROUPING IN THE SECOND MATRIX

↓

SELECT REFINEMENT PARAMETERS OF PRODUCTS, THE REFINEMENT PARAMETERS COMPRISING A SUB-SET OF A SET OF METADATA PARAMETERS ASSOCIATED WITH THE PRODUCTS

↓

FOR EACH GROUP OF VIEWERS, RANK THE REFINEMENT PARAMETERS WITH RESPECT TO MUTUAL INFORMATION BETWEEN A REFINEMENT PARAMETER VALUE AND A PRODUCT CHOICE WITHIN EACH GROUP OF VIEWERS

↓

PRESENT TO AN INDIVIDUAL VIEWER A SET OF THE REFINEMENT PARAMETERS, THE REFINEMENT PARAMETERS ORDERED WITHIN THE SET BY A RANK CORRESPONDING TO THE VIEWER GROUP THE INDIVIDUAL VIEWER IS ASSOCIATED WITH VIEWER

FROM FIG. 8A

INTERACTIVELY PERFORM THE FOLLOWING, AT LEAST ONCE, IN RESPONSE TO THE VIEWER CHOICE OF THE REFINEMENT PARAMETERS

- SELECT A SUB-SET OF PRODUCTS FROM THE PRODUCT SET, THE SUB-SET OF PRODUCTS COMPRISING PRODUCTS WITH METADATA MATCHING THE REFINEMENT PARAMETERS SELECTED BY THE INDIVIDUAL VIEWER

- PRESENT THE INDIVIDUAL VIEWER THE SELECTED SUB-SET OF PRODUCTS AND A SET COMPRISING THE REFINEMENT PARAMETERS NOT INCLUDING THE REFINEMENT PARAMETERS ALREADY SELECTED BY THE INDIVIDUAL VIEWER

FIG. 9

RECEIVE, AT A SEARCH ENGINE, A VIEWER QUERY, THE VIEWER QUERY COMPRISING AT LEAST ONE KEY WORD

COMBINE, AT THE SEARCH ENGINE, THE VIEWER QUERY WITH DATA COMPRISED IN A VIEWER PROFILE, THEREBY GENERATING AN EXPANDED QUERY

MODIFY THE EXPANDED QUERY ACCORDING TO A CONTEXT, SHOULD THERE BE A CONTEXT, THEREBY DERIVING A FINAL QUERY

QUERY A PRODUCT DATABASE WITH THE FINAL QUERY, THE PRODUCT DATABASE COMPRISING A DATABASE OF CONTENT ITEMS

EXTRACT A LIST OF CONTENT ITEMS IN RESPONSE TO THE FINAL QUERY

DISPLAY, ON A USER DEVICE, THE LIST OF CONTENT ITEMS AND A SET OF REFINEMENT PARAMETERS ENABLING NAVIGATION WITHIN THE REST OF THE SET OF CONTENTS

METHOD FOR CONTENT PRESENTATION

RELATED APPLICATION INFORMATION

The present application is a 35 USC §371 application of PCT/IL2007/000237, filed on 21 Feb. 2007 and entitled "Method For Content Presentation", which was published in the English language on 28 Aug. 2008 with International Publication Number WO 2008/102331 A2.

FIELD OF THE INVENTION

The present invention relates to electronic program guides (EPGs) and more particularly to methods to navigate through and search EPGs in order to view video-on-demand content.

BACKGROUND OF THE INVENTION

Published GB patent application GB 2 343 075 of Sony United Kingdom, Ltd., describes a broadcast receiver containing a data store for holding a set of user preferences relating to categories of broadcast programs. Electronic program guide information is received by the apparatus and the bibliographic details of the program guide are compared with the user preferences. Those programs exhibiting at least a predetermined degree of match with the user preferences are displayed to the user.

Unpublished PCT patent application PCT/IL2006/001003 of NDS Ltd., filed 29 Aug. 2006, describes a method and system for rating programs, the method including, receiving a sample of viewing logs from a plurality of set top boxes (STBs), determining, from the sample of viewing logs, at least groups of viewers sharing similar interests, and groups of programs sharing similar audience, computing time dynamics of rating distribution for the groups of viewers and the groups of programs, and incorporating at least one of the following into broadcast metadata the time dynamics of rating distributions of the groups of viewers for each of the groups of programs, rating distributions of the groups of viewers for each of the groups of programs marginalized by time, rating distributions of the groups of viewers for each program marginalized by time, relative sizes of each group of viewers, and a mapping of each program to groups of programs, thereby making the broadcast metadata available to the plurality of STBs for use in computing ratings.

*The Information Bottleneck Method*, by Tishby et al., Proceedings of the 37th Annual Conference on Communication, Control, and Computing, 1999, defines relevant information in a signal x∈X as being the information that this signal provides about another signal y∈Y. Examples include the information that face images provide about the names of the people portrayed, or the information that speech sounds provide about the words spoken. Understanding the signal x requires more than just predicting y, it also requires specifying which features of X play a role in the prediction. The problem is formalized as that of finding a short code for X that preserves the maximum information about Y. That is, the information that X provides about Y is squeezed through a 'bottleneck' formed by a limited set of codewords $\tilde{X}$. This constrained optimization problem can be seen as a generalization of rate distortion theory in which the distortion measure $d(x,\tilde{x})$ emerges from the joint statistics of X and Y. The approach yields an exact set of self-consistent equations for the coding rules $X \rightarrow \tilde{X}$ and $\tilde{X} \rightarrow Y$. Solutions to these equations can be found by a convergent re-estimation method that generalizes the Blahut-Arimoto algorithm.

*The Power of Word Clusters for Text Classification*, by Slonim, et al., Proceedings of the 23rd European Colloquium on Information Retrieval Research, 2001, cites the above-mentioned Tishby, et al. The Information Bottleneck method provides an information theoretic framework, for extracting features of one variable, that are relevant for the values of another variable. Several previous works already suggested applying this method for document clustering, gene expression data analysis, spectral analysis and more. In this work they present a novel implementation of this method for supervised text classification. Specifically, we apply the information bottleneck method to find word-clusters that preserve the information about document categories and use these clusters as features for classification.

*Unsupervised Document Classification Using Sequential Information Maximization*, by Slonim, et al., Proceedings of the 25th ACM International Conference on Research and Development of Information Retrieval, SIGIR 2002, Tampere, Finland, Copyright 2002 ACM 1-58113-561-0/02/0008, presents a novel sequential clustering algorithm which is motivated by the Information Bottleneck (IB) method. In contrast to the agglomerative IB algorithm, the new sequential (sIB) approach is guaranteed to converge to a local maximum of the information, as required by the original IB principle. Moreover, the time and space complexity are significantly improved. We apply this algorithm to unsupervised document classification. In our evaluation, on small and medium size corpora, the sIB is found to be consistently superior to all the other clustering methods we examine, typically by a significant margin. Moreover, the sIB results are comparable to those obtained by a supervised Naive Bayes classifier. Finally, we propose a simple procedure for trading cluster's recall to gain higher precision, and show how this approach can extract clusters which match the existing topics of the corpus almost perfectly.

*Evaluating Collaborative Filtering Recommender Systems*, by J. Herlocker et al, published in ACM Transactions on Information Systems, Vol. 22, issue, January 2004, reviews the key decisions in evaluating collaborative filtering recommender systems: the user tasks being evaluated, the types of analysis and datasets being used, the ways in which prediction quality is measured, the evaluation of prediction attributes other than quality, and the user-based evaluation of the system as a whole. In addition to reviewing the evaluation strategies used by prior researchers, the paper presents empirical results from the analysis of various accuracy metrics on one content domain where all the tested metrics collapsed roughly into three equivalence classes. Metrics within each equivalence class were strongly correlated, while metrics from different equivalence classes were uncorrelated.

*Multivariate Information Bottleneck*, by Slonim, et al., published by the MIT Press, 2006, describes the information bottleneck (IB) method, an unsupervised model independent data organization technique. Given a joint distribution, p(X, Y), this method constructs a new variable, T, that extracts partitions, or clusters, over the values of X that are informative about Y. Algorithms that are motivated by the IB method have already been applied to text classification, gene expression, neural code, and spectral analysis. A general principled framework for multivariate extensions of the IB method is introduced. This allows considering multiple systems of data partitions that are interrelated. The approach utilizes Bayesian networks for specifying the systems of clusters and which information terms should be maintained. It is shown that this construction provides insights about bottleneck variations and enables us to characterize the solutions of these variations. Four different algorithmic approaches are developed, allowing construction of solutions in practice and applying them to several real-world problems.

*Biclustering Algorithms for Biological Data Analysis: A Survey*, by S. Madiera, et al., published in IEEE/ACM Transactions on Computational Biology and Bioinformatics, Volume 1, Issue 1 (January 2004), pages 24-45, describes how a large number of clustering approaches have been proposed for the analysis of gene expression data obtained from microarray experiments. However, the results from the application of standard clustering methods to genes are limited. This limitation is imposed by the existence of a number of experimental conditions where the activity of genes is uncorrelated. A similar limitation exists when clustering of conditions is performed. For this reason, a number of algorithms that perform simultaneous clustering on the row and column dimensions of the data matrix have been proposed. The goal is to find submatrices, that is, subgroups of genes and subgroups of conditions, where the genes exhibit highly correlated activities for every condition. In the Madiera, et al. paper, they refer to this class of algorithms as biclustering. Biclustering is also referred in the literature as coclustering and direct clustering, among others names, and has also been used in fields such as information retrieval and data mining. In this comprehensive survey, they analyze a large number of existing approaches to biclustering, and classify them in accordance with the type of biclusters which can be found, the patterns of biclusters that are discovered, the methods used to perform the search, the approaches used to evaluate the solution, and the target applications.

Websites such as www.shopping.com; www.zap.co.il; and shopping.yahoo.com all comprise displays of a large content database arranged in an efficient fashion.

The disclosures of all references mentioned above and throughout the present specification, as well as the disclosures of all references mentioned in those references, are hereby incorporated herein by reference.

SUMMARY OF THE INVENTION

The present invention seeks to provide an improved method and system for automating the organizing and displaying content, and particularly video-on-demand (VOD) content and Electronic Program Guides (EPGs), to viewers.

Typically, VOD servers and EPGs offer associated viewers from hundreds to thousands of video content products. A simple calculation shows that any static content presentation scheme typically requires a hierarchy of more than five levels of choices, assuming about 7 items per display screen, in order to display most content items offered. Such a large number of display screens are typically unacceptable in a television environment, leaving most of the content items unutilized or underutilized.

It is the opinion of the inventors of the present invention that "Top 10", "Blockbuster", or even "Top 50" types of content do not require VOD. Such content will be sought out by viewers and might even be pushed onto local disks on viewer PVRs. On the other hand, content in the so-called "long-tail"—products that are in low demand or have low sales volume which can collectively make up a market share that rivals or exceeds the relatively few current bestsellers and blockbusters, if the store or distribution channel is large enough—will create niche markets which will make VOD profitable. Furthermore, in niche market content, like recorded content has no prime time—the consumer views the content at the viewer's convenience.

The present invention, in preferred embodiments thereof proposes a set of solutions that enables a viewer easily and quickly to access to the personally mostly relevant subset. By, "easily and quickly", it is meant that access will require a smallest possible amount of remote control activations and selections by the viewer. Those skilled in the art will appreciate that information capacity of a TV screen is highly limited—typically, not more than 6-8 choice items appear on a single screen. Therefore, even with a full tree branching, it is possible to reach at most $8^3=512$ items within a 3-screens-depth selection hierarchy (3 screens being an approximate upper limit on the patience of the viewer to make selections). Presenting thousands of items in a common static grid is very difficult, and personalization solutions are essential to make the abundance of choice useful. It is appreciated that the Internet approach of keyword-based query formulations is inappropriate for television both due to text input limitations (remote control vs. keyboard) as well as the passive nature of TV watching experience.

In a first preferred embodiment of the present invention, a personal EPG is created, preferably by taking content items which are personally more relevant to the viewer to upper levels of the EPG grid. A method for estimation of relevance of a given program to a given viewer is described by the inventors of the present invention in PCT patent application PCT/IL2006/001003, the disclosure of which is hereby incorporated by reference. The present invention provides a method for easy navigation through content in an EPG, and query refinement according to multiple most distinctive parameters. For example and without limiting the generality of the foregoing, a screen for selecting movies in an EPG may be refined not only by genres, as it is done now, but also by studios, directors, actors, and so forth. Unlike modern Internet shopping sites, refinement of selection is preferably automated and personalized. Personalized refinement parameters (keywords) are presented to the viewer, thereby enabling easy and effective narrowing of choices presented to the user.

In an alternative preferred embodiment of the present invention, a process of choosing a next program to watch, whereby at the end of a program, a brief list of programs suggested to "Watch Next" is preferably presented to the viewer. The list preferably eases the process of choosing a next program to watch, in that, preferably, at least one of the programs suggested in the "Watch Next" list is selected by the viewer for viewing. Furthermore, in order to accelerate the process of learning viewer preferences, programs are suggested, the programs comprising a fifty-fifty probability of being chosen by the viewer. In the event that the viewer does choose one of the suggested "fifty-fifty" programs enables learning about viewer preferences. Nonetheless, it is preferable that such "risky" recommendations should be offered only minimally. It is suggested that a typical "Watch Next" list comprise two or three programs with a high probability of selection, and one "fifty-fifty" program.

Mutual information of two variables, as the term "mutual information" is used in both probability theory and in information theory, refers to a quantity that measures the mutual dependence of the two variables. Formally, mutual information of two discrete random variables X and Y is defined as:

$$I(X;Y) = \sum_{y \in Y} \sum_{x \in X} p(x,y) \log \frac{p(x,y)}{p(x)p(y)}$$

where p(x,y) is a joint probability distribution function of X and Y, and p(x) and p(y) are the marginal probability distribution functions of X and Y respectively. Intuitively, mutual information measures the information that X and Y share.

Specifically, mutual information measures how much knowing about one of X or Y reduces uncertainly about the other variable, Y or X.

There is thus provided in accordance with a preferred embodiment of the present invention a method for personalizing an electronic program guide (EPG), the method including establishing a first matrix populated by ratings associated with a first plurality of v viewers in a content distribution system and a second plurality of p products each of which is a content item, the first matrix having dimensions v and p, each entry in the first matrix including either an empty entry or a rating indicating viewer interest in a content item, bi-clustering the first matrix, thereby producing a second matrix, the second matrix including a matrix of ratings including a grouping of the viewers according to similarity of products chosen by the viewers and a grouping of the products according to similarity of viewers who viewed the products, scoring metadata components associated with the products according to the matrix of ratings and producing a resulting score for each metadata component, establishing, based at least in part on the score for each metadata component, a third matrix, the third matrix including a matrix of groups of viewers according to metadata scores, establishing an auxiliary matrix of viewers according to viewer profile parameters, each entry in the auxiliary matrix indicating a viewer profile of an associated viewer and including a particular viewer profile parameter, grouping together matrix entries of viewers with similar viewer profile parameters in the auxiliary matrix, thereby producing a fourth matrix, the fourth matrix including a matrix of groups of viewers according to viewer profile parameters, for each of the products producing a product grid for each viewer group by sorting program groups for each viewer group, according to entries in the second matrix, and identifying, for each group of viewers, a plurality of metadata parameters most likely to be associated with each viewer among the groups of viewers, affiliating each individual viewer among the plurality of viewers with a viewer group, obtaining a personal EPG view for at least one individual viewer, based, at least in part, on the affiliation of the individual viewer with a viewer group and the metadata parameters of the products, and displaying the personal EPG view for the at least one individual viewer, wherein the metadata parameters of the products include the identified most informative metadata parameters for a group of viewers to which the at least one viewer belongs.

Further in accordance with a preferred embodiment of the present invention the rating includes a measure of interest of at least one individual viewer in a product.

Still further in accordance with a preferred embodiment of the present invention the rating includes a fraction, the fraction including a ratio of time the at least one individual viewer viewed the product to a total length of the product.

Additionally in accordance with a preferred embodiment of the present invention the second matrix also includes time-of-day information.

Moreover in accordance with a preferred embodiment of the present invention the metadata components include title, leading actor, leading actress, artist, director, viewing price, length, genre, country of production, and year of production.

Further in accordance with a preferred embodiment of the present invention an unrated product is associated with rated products by determining which grouping of the products including rated products includes metadata most closely matching metadata of the unrated product.

Still further in accordance with a preferred embodiment of the present invention the comparison of unrated product with rated products is performed giving different weights to different metadata parameters.

Additionally in accordance with a preferred embodiment of the present invention the weighting of metadata parameters differs for different groups of viewers.

Moreover in accordance with a preferred embodiment of the present invention the weight of metadata parameters is determined according to a statistical correlation of metadata parameter with program ratings within a given group of viewers.

Further in accordance with a preferred embodiment of the present invention the unrated programs are associated with groups of viewers by cross-referencing the grouping of the products associated with the unrated product with groups of viewers in the second matrix, such that the associated groups of viewers include groups of viewers including high ratings for the grouping of the products associated with the unrated product.

Still further in accordance with a preferred embodiment of the present invention each viewer among the plurality of viewers is associated with one group of viewers by comparing ratings derived from a viewer associated viewing log with ratings of each viewer group, and associating each viewer with a group of viewers, such that the ratings of the associated group of viewers most closely resembles the ratings of the viewer.

There is also provided in accordance with another preferred embodiment of the present invention a method of personalizing organization of a product set, the method including establishing a first matrix populated by ratings associated with a first plurality of v viewers in a content distribution system and a second plurality of p products each of which is a content item, the first matrix having dimensions v and p, each entry in the first matrix including either an empty entry or a rating indicating viewer interest in a content item, bi-clustering the first matrix, thereby producing a second matrix, the second matrix including a matrix of ratings including a grouping of the viewers according to similarity of products chosen by the viewers and a grouping of the products according to similarity of viewers who viewed the products, associating viewers into groups of viewers based on the viewer grouping in the second matrix, selecting refinement parameters of products, the refinement parameters including a subset of a set of metadata parameters associated with the products, for each group of viewers, ranking the refinement parameters with respect to mutual information between a refinement parameter value and a product choice within each group of viewers, presenting to an individual viewer a set of the refinement parameters, the refinement parameters ordered within the set by a rank corresponding to the viewer group the individual viewer is associated with, and interactively performing the following, at least once, in response to the viewer choice of the refinement parameters selecting a sub-set of products from the product set, the sub-set of products including products with metadata matching the refinement parameters selected by the individual viewer, and presenting the individual viewer the selected sub-set of products and a set including the refinement parameters not including the refinement parameters already selected by the individual viewer.

Further in accordance with a preferred embodiment of the present invention at least one refinement parameter includes a director name.

Still further in accordance with a preferred embodiment of the present invention at least one refinement parameter includes an actor name.

Additionally in accordance with a preferred embodiment of the present invention at least one refinement parameter includes a product length.

Moreover in accordance with a preferred embodiment of the present invention at least one refinement parameter includes a price to view a product.

Further in accordance with a preferred embodiment of the present invention at least one refinement parameter includes a product language.

Still further in accordance with a preferred embodiment of the present invention at least one refinement parameter includes a parental rating.

Additionally in accordance with a preferred embodiment of the present invention at least one refinement parameter includes a product genre.

Moreover in accordance with a preferred embodiment of the present invention at least one refinement parameter includes at least one word of a product title.

Further in accordance with a preferred embodiment of the present invention at least one refinement parameter includes at least one word of a product synopsis.

Still further in accordance with a preferred embodiment of the present invention the product set includes at least content listed in a VOD catalog.

Additionally in accordance with a preferred embodiment of the present invention the product set includes at least content listed in a program guide.

Moreover in accordance with a preferred embodiment of the present invention the product set includes at least one of content listed in a daily program guide, and content listed in a weekly program guide.

Further in accordance with a preferred embodiment of the present invention the product set includes at least one content item recorded on disk (PVR).

Still further in accordance with a preferred embodiment of the present invention the product set includes at least any superset of content listed in a VOD catalog, content listed in a daily program guide, content listed in a weekly program guide, and at least one content item recorded on disk (PVR).

Additionally in accordance with a preferred embodiment of the present invention the product set includes at least a result of a query of at least one of content listed in a VOD catalog, content listed in a daily program guide, and content listed in a weekly program guide, and content recorded on disk (PVR).

Moreover in accordance with a preferred embodiment of the present invention the product set includes at least a result of a viewer filter of at least one of content listed in a VOD catalog, content listed in a daily program guide, content listed in a weekly program guide, and content recorded on disk (PVR).

Further in accordance with a preferred embodiment of the present invention the product set includes at least a result of a combination of a result of a query and/or a result of a viewer filter on any combination of content listed in a VOD catalog, content listed in a daily program guide, content listed in a weekly program guide, and content recorded on disk (PVR).

Still further in accordance with a preferred embodiment of the present invention the viewer filter includes a language filter.

Additionally in accordance with a preferred embodiment of the present invention the viewer filter includes a parental rating filter.

Moreover in accordance with a preferred embodiment of the present invention the viewer filter includes a filter according to a keyword.

Further in accordance with a preferred embodiment of the present invention the query includes a keyword based search query.

There is also provided in accordance with still another preferred embodiment of the present invention a method of organizing content in a program guide, the method including receiving, at a search engine, a viewer query, the viewer query including at least one key word, combining, at the search engine, the viewer query with data included in a viewer profile, thereby generating an expanded query, modifying the expanded query according to a context, should there be a context, thereby deriving a final query, querying a product database with the final query, the product database including a database of content items, extracting a list of content items in response to the final query, and displaying, on a user device, the list of content items and a set of refinement parameters enabling navigation within the rest of the set of contents.

Further in accordance with a preferred embodiment of the present invention the at least one keyword includes a leading actor, an artist, a price, a director, and a length.

Still further in accordance with a preferred embodiment of the present invention the viewer profile includes at least one of parental rating, preferred viewing language, subscription package, viewer age, viewer gender, location of television, number of viewers in a viewing household, and EPG themes.

Additionally in accordance with a preferred embodiment of the present invention the context includes an environment from which the viewer query is received.

Moreover in accordance with a preferred embodiment of the present invention the viewer query includes a refinement query.

Further in accordance with a preferred embodiment of the present invention the viewer query includes a metadata query.

There is also provided in accordance with still another preferred embodiment of the present invention a system for personalizing an electronic program guide (EPG), the system including a first matrix populating unit, operative to populate a first matrix by ratings associated with a first plurality of v viewers in a content distribution system and a second plurality of p products each of which is a content item, the first matrix having dimensions v and p, each entry in the first matrix including either an empty entry or a rating indicating viewer interest in a content item, a bi-clustering unit, operative to bi-cluster the first matrix, thereby producing a second matrix, the second matrix including a matrix of ratings including a grouping of the viewers according to similarity of products chosen by the viewers and a grouping of the products according to similarity of viewers who viewed the products, a metadata scoring apparatus operative to score metadata components associated with the products according to the matrix of ratings and produce a resulting score for each metadata component, a third matrix establishing unit, operative to establish, based at least in part on the score for each metadata component, a third matrix, the third matrix including a matrix of groups of viewers according to metadata scores, an auxiliary matrix establishing unit, operative to establish an auxiliary matrix of viewers according to viewer profile parameters, each entry in the auxiliary matrix indicating a viewer profile of an associated viewer and including a particular viewer profile parameter, a matrix entry grouper operative to group together matrix entries of viewers with similar viewer profile parameters in the auxiliary matrix, thereby producing a fourth matrix, the fourth matrix including a matrix of groups of viewers according to viewer profile parameters, a processor, which, for each of the products produces a product grid for each viewer group by sorting program groups for each viewer group, according to entries in the second matrix, and identifies, for each group of viewers, a plurality of metadata parameters most likely to be associated with each viewer among the groups of viewers, an affiliating unit which affiliates each individual viewer among the plurality of viewers with a viewer group, a personal EPG view producer operative to produce a personal EPG view for at least one individual viewer, based, at least in part, on the affiliation of the individual viewer with a viewer group and the metadata parameters of the products, and a display unit operative to display the personal EPG view for the at least one individual viewer, wherein the metadata parameters of the products include the identified most informative metadata parameters for a group of viewers to which the at least one viewer belongs.

There is also provided in accordance with still another preferred embodiment of the present invention a system of personalizing organization of a product set, the system including a first matrix populating unit, operative to populate a first matrix by ratings associated with a first plurality of v viewers in a content distribution system and a second plurality of p products each of which is a content item, the first matrix having dimensions v and p, each entry in the first matrix including either an empty entry or a rating indicating viewer interest in a content item, a bi-clustering unit, operative to bi-cluster the first matrix, thereby producing a second matrix, the second matrix including a matrix of ratings including a grouping of the viewers according to similarity of products chosen by the viewers and a grouping of the products according to similarity of viewers who viewed the products, a viewer group associator, operative to associate viewers into groups of viewers based on the viewer grouping in the second matrix, a refinement parameter selector operative to select refinement parameters of products, the refinement parameters including a sub-set of a set of metadata parameters associated with the products, a ranker, which, for each group of viewers, ranks the refinement parameters with respect to mutual information between a refinement parameter value and a product choice within each group of viewers, a presenter operative to present to an individual viewer a set of the refinement parameters, the refinement parameters ordered within the set by a rank corresponding to the viewer group the individual viewer is associated with, and a processor including a product sub-set selector and a sub-set presenter, wherein, the processor interactively, at least once, in response to the viewer choice of the refinement parameters the product sub-set selector selects a sub-set of products from the product set, the sub-set of products including products with metadata matching the refinement parameters selected by the individual viewer, and the sub-set presenter presents the individual viewer the selected sub-set of products and a set including the refinement parameters not including the refinement parameters already selected by the individual viewer.

There is also provided in accordance with still another preferred embodiment of the present invention a system of organizing content in a program guide, the system including a search engine including a receiver, the receiver operative to receive a viewer query, the viewer query including at least one key word, a combiner operative to combine, at the search engine, the viewer query with data included in a viewer profile, thereby generating an expanded query, a query modifier which modifies the expanded query according to a context, should there be a context, thereby deriving a final query, a database querying agent which queries a product database with the final query, the product database including a database of content items, an extractor which extracts a list of content items in response to the final query, and a displayer, which displays, on a user device, the list of content items and a set of refinement parameters enabling navigation within the rest of the set of contents.

BRIEF DESCRIPTION OF THE DRAWINGS

The present invention will be understood and appreciated more fully from the following detailed description, taken in conjunction with the drawings in which:

FIG. 1 is a simplified pictorial illustration of a system in which video-on-demand (VOD) content is presented differently in an Electronic Program Guide (EPG) to different users, constructed and operative in accordance with a preferred embodiment of the present invention;

FIG. 3 is a simplified block diagram of a preferred method of processing viewing statistics data, program metadata, and viewer profile data, used in producing the EPG of FIGS. 2A and 2B;

FIGS. 7A, 7B, 8A, 8B, and 9 are simplified flowchart illustrations of preferred methods of operation of the system of FIG. 1, in accordance with preferred embodiments thereof.

DETAILED DESCRIPTION OF A PREFERRED EMBODIMENT

Reference is now made to FIG. 1, which is a simplified pictorial illustration of a system in which video-on-demand (VOD) content is presented differently in an Electronic Program Guide (EPG) to different users, constructed and operative in accordance with a preferred embodiment of the present invention. The system of FIG. 1 comprises a broadcast headend 10, a network 12, a plurality of set top boxes (STBs) 20, 30, and a plurality of EPGs 40, 50, each EPG associated with one STB from among the plurality of STBs 20, 30.

The operation of the system of FIG. 1 is now described. Broadcast data is broadcast from the broadcast headend 10 over the network 12 to the individual STBs 20 and 30 among the plurality of STBs 20, 30. It is appreciated that the network 12 may comprise an ADSL network, a wireless network, a cable network, or even a satellite broadcast network. Those skilled in the art will appreciate that the broadcast data comprises a combination of video data, audio data, and metadata. The metadata typically comprises data from which EPG screens are derived. The individual STBs 20 and 30 comprise an appropriate combination of hardware and software, as is well known in the art.

A viewer 60, 70 is depicted in each bubble, the viewer 60, 70 viewing one of the plurality of EPGs 40, 50 on a television 80, 90. It is appreciated that the plurality of EPGs 40, 50 do not comprise a typical EPG grid of the sort which is well known in the art.

Figure 2A:
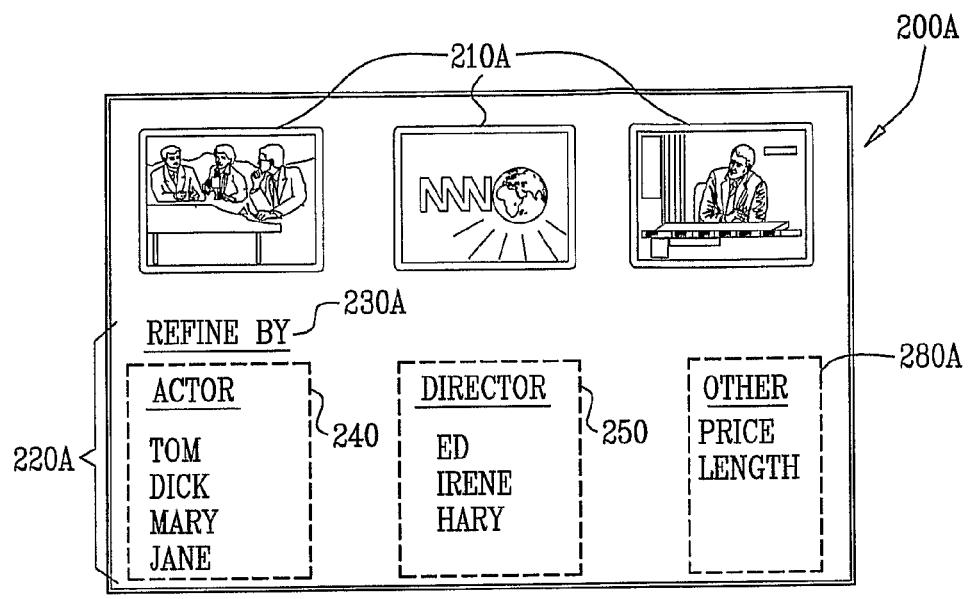
FIGS. 2A and 2B are simplified illustrations of a preferred embodiment of an EPG, the EPG displaying information according to a preferred implementation of the system of FIG. 1.
Figure 2B:
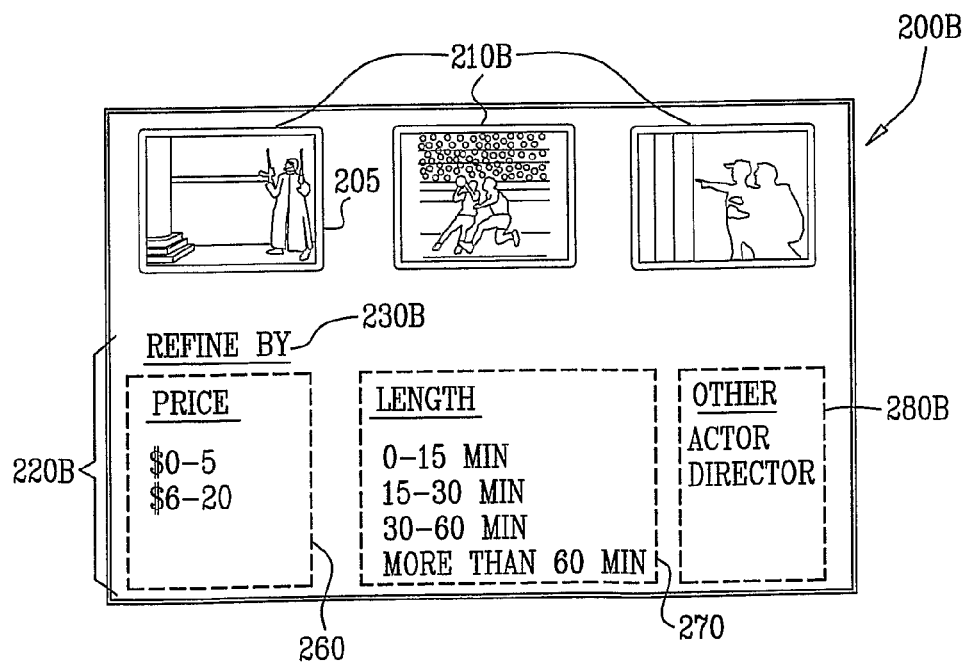

Reference is now made to FIGS. 2A and 2B, which are simplified illustrations of a preferred embodiment of an EPG 200A, 200B, the EPG 200A, 200B displaying information according to a preferred implementation of the system of FIG. 1. The EPG 200A, 200B depicted in FIGS. 2A and 2B comprises a group of icons 210A, 210B, the group of icons 210A, 210B comprising direct links to particular content. For example and without limiting the generality of the foregoing, selecting icon 205 may tale the viewer 60, 70 (FIG. 1) to a particular adventure movie, the particular adventure movie being represented by the icon 205. Each icon of the group of icons 210A, 210B represents content which it is expected that the viewer 60, 70 (FIG. 1) is most likely to want to view, as explained below, with reference to FIGS. 3-6.

The EPG 200A, 200B also comprises an interface 220A, 220B which enables the viewer 60, 70 (FIG. 1) to refine a query, the query comprising a mechanism whereby the group of icons 210A, 210B is selected for display. For example and without limiting the generality of the foregoing, continuing the example given above, if the icon 205 represents a particular adventure movie, perhaps the viewer 60, 70 (FIG. 1) does not want to see the movie represented by the icon 205, but does want to see a movie with the same star as the movie represented by the icon 205. In a "Refine by" 230A, 230B field in the EPG, the viewer 60, 70 (FIG. 1) is able to select additional search parameters to add to the query. Non-limiting examples of such search parameters which the viewer 60, 70 (FIG. 1) is able to select are depicted in FIGS. 2A and 2B as comprising Actor 240, Director 250, Price 260, and Length 270.

In addition, the viewer 60, 70 (FIG. 1) is preferably able to search using search parameters not displayed on a presently displayed EPG screen. For example and without limiting the generality of the foregoing, the EPG 200A provides the viewer 60, 70 (FIG. 1) with "Other" 280A fields, enabling the viewer 60, 70 (FIG. 1) to select and view Price 260 search parameters or, alternatively, to select and view Length 270 search parameters. Likewise, the EPG 200B provides the viewer 60, 70 (FIG. 1) with "Other" 280B fields, enabling the viewer 60, 70 (FIG. 1) to select and view Actor 240 search parameters or, alternatively, to select and view Director 250 search parameters. For example and without limiting the generality of the foregoing, if the viewer 60, 70 (FIG. 1) is viewing EPG 200B, and wishes to select content with a particular actor, by selecting Actor from the Other field 280B, the viewer 60, 70 (FIG. 1) is able to access the list of actors 240. Methods of populating the list of actors 240, the list of directors 250, the list of prices 260, and the list of lengths 270 are discussed below, particularly with reference to the discussion of FIG. 6. It is appreciated that the population of the list of actors 240, the list of directors 250, the list of prices 260, and the list of lengths 270 as well as the group of icons 210A, 210B comprises a method of personalizing the list of actors 240, the list of directors 250, the list of prices 260, and the list of lengths 270 as well as the group of icons 210A, 210B.

Reference is now made to FIG. 3, which is simplified block diagram of a preferred method of processing viewing statistics data, program metadata, and viewer profile data, used in producing the EPG of FIGS. 2A and 2B. Viewing statistics are gathered from a plurality of viewers 60, 70 (FIG. 1). Specifically, viewing habits of a plurality of viewers 300 (depicted in FIG. 1 as the viewer 60, 70) are monitored by a VOD server 310 which provides video on viewer demand. The VOD server 310 comprises a VOD database. The VOD database comprises content available on demand to any of the plurality of viewers 300.

The VOD server 310 monitors consumption of content and outputs a matrix of viewers by products 320. For each viewer, denoted V, and each content item comprised in the VOD database, denoted x, the matrix of viewers by products 320 comprises an empty entry if viewer V has never viewed content x. Alternatively, the matrix of viewers by products 320 comprises a rating $r_V(x)$ if viewer V has viewed content x. The rating $r_V(x)$ preferably reflects the measure of interest of V in x. For example and without limiting the generality of the foregoing, $r_V(x)$ may be determined by measuring the fraction of time the viewer V viewed the content x compared to a total length of content x. Preferred methods of rating content are discussed extensively in as yet unpublished PCT patent application PCT/IL2006/001003 of NDS Ltd., the disclosure of which is hereby incorporated by reference. It is appreciated that other appropriate rating schemes may be implemented by the VOD server 310 in order to generate the matrix of viewers by products 320, and the method of determining the rating $r_V(x)$ given above is a non-limiting example of one appropriate preferred method of determining the rating $r_V(x)$. It is also appreciated that generally, a product which has been highly rated by a large number of viewers is assumed to be generally in demand. A product which is generally in demand typically commands a higher price. Alternatively, assuming that a large number of viewers will purchase the product which is generally in demand, a broadcaster or content provider is able to offer the product at a lower price, thereby attempting to increase revenue by attracting more customers and collecting less money per customer, but from more customers.

It is appreciated that the products used to output the matrix of viewers by products 320 comprise, at least, content comprising VOD catalog content, content listed in a daily or a weekly program guide, and at least one content item recorded on a recording medium, for example and without limiting the generality of the foregoing, a hard disk drive in a PVR.

The matrix of viewers by products 320 undergoes a bi-clustering process 325, whereby both:
individual viewers 60, 70 (FIG. 1) among the plurality of viewers 300 are grouped according to similarity of content items viewed; and
content items are grouped according to similarity of viewing audience.

Any appropriate bi-clustering technique may be used, see *Biclustering Algorithms for Biological Data Analysis: A Survey*, by S. Madiera, et al., referred to above, for a review of bi-clustering techniques. S. Madiera, et al. is hereby incorporated herein by reference. One biclustering technique presented in Madeira et al., brought here as a non-limiting example, is that of Cheng and Church. Define a bicluster as a subset of rows and a subset of columns with a high similarity score. The similarity score introduced and called mean squared residue, H, was used as a measure of the coherence of the rows and columns in the bicluster. Given the data matrix A=(X, Y) a bicluster was defined as a uniform sub-matrix (I, J) having a low mean squared residue score. A submatrix (I, J) is considered a δ-bicluster if H(I, J)<δ for some δ≧0. In particular, they aim at finding large and maximal biclusters with scores below a certain threshold δ.

In a perfect δ-bicluster each row/column or both rows and columns exhibits an absolutely consistent bias (δ=0). This means that the values in each row or column can be generated by shifting the values of other rows or columns by a common offset. When this is the case, δ=0 and each element $a_{ij}$ can be uniquely defined by its row mean, $a_{iJ}$, its column mean, $a_{Ij}$, and the bicluster mean, $a_{IJ}$. The difference $a_{Ij}-a_{IJ}$ is the relative bias held by the column j with respect to the other columns in the δ-bicluster. The same reasoning applied to the rows leads to the definition that, in a perfect δ-bicluster, the value of an element, $a_{ij}$, is given by a row-constant plus a column-constant plus a constant value: $a_{ij}=a_{iJ}+a_{Ij}-a_{IJ}$.

Unfortunately, due to noise in data, δ-biclusters may not always be perfect. The concept of residue was thus introduced to quantify the difference between the actual value of an element $a_{ij}$ and its expected value predicted from the corresponding row mean, column mean and bicluster mean.

The residue of an element $a_{ij}$ in the bicluster (I, J) was defined as follows: $r(a_{ij}) = a_{ij} - a_{iJ} - a_{Ij} + a_{IJ}$ Assuming the possible existence of residue, the value of $a_{ij}$ in a non-perfect bicluster is then defined as: $a_{ij} = r(a_{ij}) + a_{iJ} + a_{Ij} - a_{IJ}$ where the value of the residue is an indicator of the coherence of a value relatively to the remaining values in the bicluster given the biases of the relevant rows and the relevant columns. The lower the residue, the stronger the coherence.

In order to assess the overall quality of a δ-bicluster, Cheng and Church defined the mean squared residue, H, of a bicluster (I, J) as the sum of the squared residues. The mean squared residue score is given by:

$$H(I, J) = \frac{1}{|I||J|} \sum_{i \in I, j \in J} r(a_{ij})^2$$

Using this merit function makes it possible to find biclusters with coherent values across both rows and columns since a score H(I, J)=0 indicates that the values in the data matrix fluctuate in unison. This includes, as a particular case, biclusters with constant values.

Returning to the discussion of FIG. 3, the bi-clustering process 325 generates a new matrix comprising a matrix of groups of viewers by groups of products 330. It is appreciated that the matrix of groups of viewers by groups of products 330 comprises typical ratings that viewers in a given group have given to products in a given group. It is further appreciated, as discussed in unpublished PCT patent application PCT/IL2006/001003 of NDS Ltd., that time-of-day information may also be added to the matrix of groups of viewers by groups of products 330 to determine time-varying rating distributions, thereby creating a three-dimensional matrix of groups of viewers by groups of products by time-of-day.

The matrix of groups of viewers by groups of products 330 is preferably used to classify and score metadata parameters of available VOD products. It is appreciated that each content item which comprises a VOD product comprises associated metadata. For example and without limiting the generality of the foregoing, a movie offered as a video-on-demand product typically comprises a title, a leading actor, a leading actress, a director, a viewing price, a length, a genre, a country of production, a year of production, and so forth. Data such as the title, the leading actor, the leading actress, the director, the viewing price, the length and so forth is typically found in VOD product associated metadata. It is appreciated that the VOD product associated metadata will vary depending on content considered. For example and without limiting the generality of the foregoing, in the case of music clips, leading actor or leading actress would be replaced with artist.

Typically, as more and more VOD product associated metadata is acquired, an average amount of relevant information carried in each additional metadata parameter decreases. For example and without limiting the generality of the foregoing, a name-by-name comparison of supporting actors in a movie will typically add more noise than signal after a comparison of leading actors is performed. Consider a comparison of two movies. If five identical supporting actors acted in each of the two movies, but each movie has different leading actors, typically, the leading actors should receive more weight than information about the supporting actors. Treating the supporting actors with equal weight to the different leading actors typically adds noise. As an additional non-limiting example, consider viewing price. Viewing price may have different weight for different viewers 60, 70 (FIG. 1). A first viewer may only view free content. A second viewer may view content without regard to viewing price. For the first viewer, price is an important selection parameter, perhaps more than any other selection parameter, such as leading actor. On the other hand, for the second viewer, viewing price is a nearly irrelevant constraint. Accordingly, metadata parameters are preferably ranked according to descriptive and discriminative power. Preferably, a metadata analysis system 340 performs metadata analysis, taking into account the descriptive and discriminative power of various metadata elements for various groups of viewers.

The metadata analysis system 340 preferably operates on a matrix of VOD products by metadata elements 350, and preferably also operates on a matrix of products ratings by groups of viewers 320 and performs a ranking of the metadata. The ranking of the metadata is performed by correlating the metadata parameters with ratings distributions within each group of viewers separately. It is appreciated that since there are multiple metadata parameters, a parameter which may be correlative for a first group of viewers may be non-correlative for a second group of viewers. For example and without limiting the generality of the foregoing, the first group of viewers may like a particular actress, while the second group of viewers may be indifferent to her presence in a movie. In such a case there will typically be high correlation between presence of that actress in a given movie and movie rating within the first group of viewers, but no or low correlation between actress presence and movie rating within the second group of viewers. On the other hand, the second group of viewers may be highly influenced by the price of a movie, whereas the first group of viewers may be indifferent to the price. In this case there will be high correlation between movie price and the fact of choice of the movie by the second group of viewers, but no or low correlation between the choice and the price within the first group of viewers. It is appreciated that a weighted combination of several metadata parameters may be required to obtain a higher correlation between the parameters and the choice of the viewers.

The metadata parameters are thereby ordered according to their correlation with corresponding product ratings within each individual group of viewers. Metadata parameters are also preferably utilizable in generating the EPG of FIGS. 2A and 2B. Additionally, using metadata parameters for an unrated VOD product, it is thereby preferably possible to determine, based on metadata parameters of the unrated VOD product, a matrix of metadata relevance for program rating by groups of viewers 360, and the matrix of ratings for groups of viewers by groups of programs matrix of groups of viewers by groups of products 330 to predict an initial rating for otherwise unrated VOD products.

A set of viewer parameters is predetermined, the set comprising a plurality of characteristics which may apply to a given viewer. For example and without limiting the generality of the foregoing, predetermined viewer parameters may include, but are not limited to age, gender, subscription package, income information, and residence area. Other, non-predetermined viewer parameters may also comprise characteristics which may apply to a given viewer. For example and without limiting the generality of the foregoing, a non-predetermined viewer parameter may be to which subscription package a given viewer subscribes.

A viewer profile analyzing system 370 analyzes the matrix of groups of viewers by groups of products 330 and preferably also operates on a matrix of products ratings by groups of viewers matrix of viewers by products 320 in light of a matrix of viewers by viewer profile parameters 380. The viewer profile analyzing system 370 thereby determines viewer parameters typical to each of the viewer groups. This information may be organized in a matrix of groups of viewers by typical viewer profile parameters 390.

Figure 4:
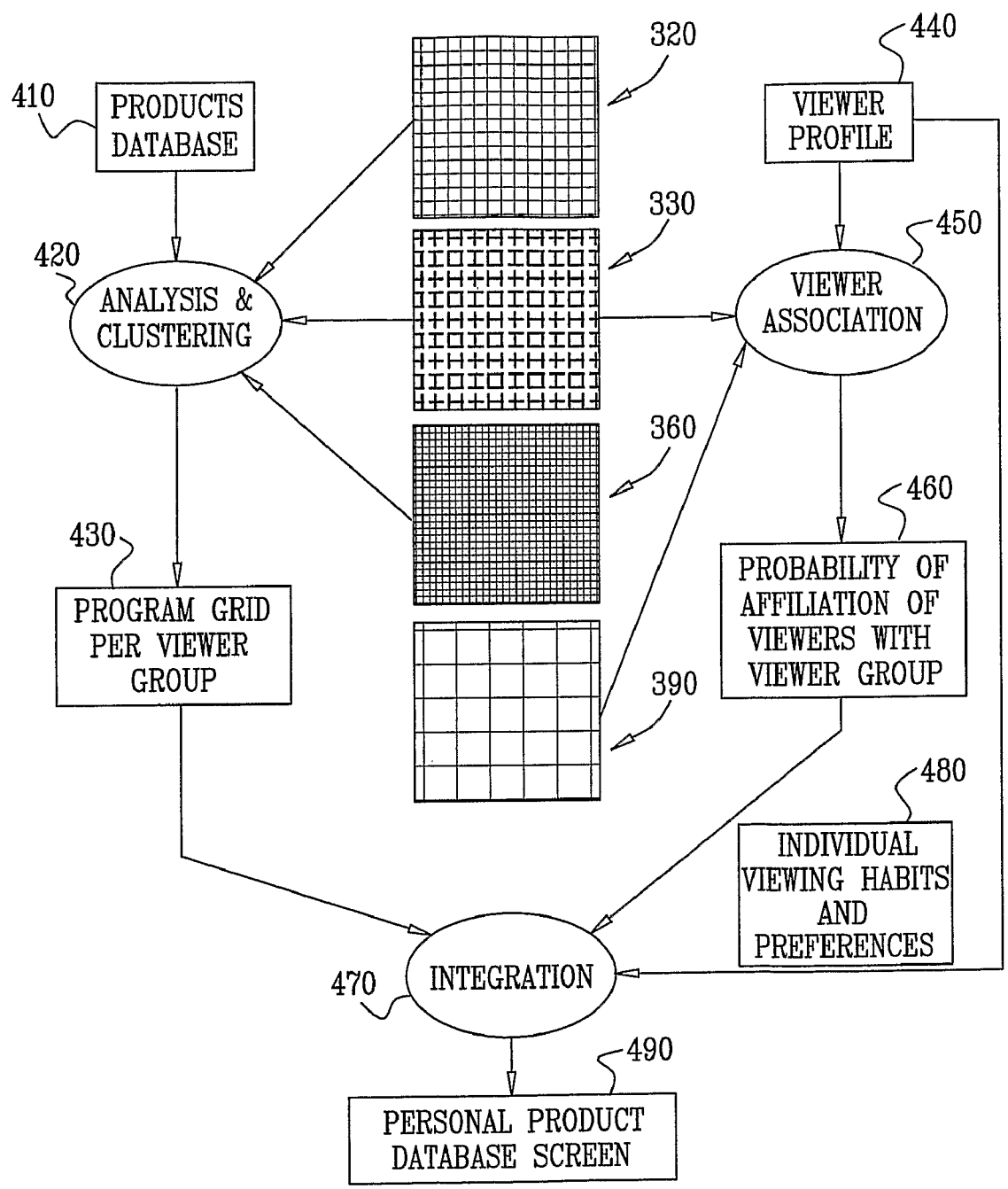
FIG. 4 is a simplified block diagram of a preferred method of a personal view of a VOD database, used in producing the EPG of FIGS. 2A and 2B.

Reference is now made to FIG. 4, which is a simplified block diagram of a preferred method of generating a personal view of a VOD database, used in producing the EPG of FIGS. 2A and 2B. The matrix of groups of viewers by groups of products 330 is obtained as described above. Unrated programs are associated with rated programs by comparing metadata parameters of the unrated programs with metadata parameters of rated programs, as described above, with reference to the discussion of the matrix of metadata relevance of program rating by groups of viewers 360. Furthermore, ratings of unrated programs are then determined per viewer group, by comparison to the matrix of viewers by products 320 and the matrix of groups of viewers by groups of products 330. For each group of VOD products and each group of users a set of most informative metadata parameters are identified, correlating mutual information between the metadata parameters and rating distributions for each particular group of viewers. Based on the set of most informative metadata parameters, a multi-tree category hierarchy is built.

Figure 5:
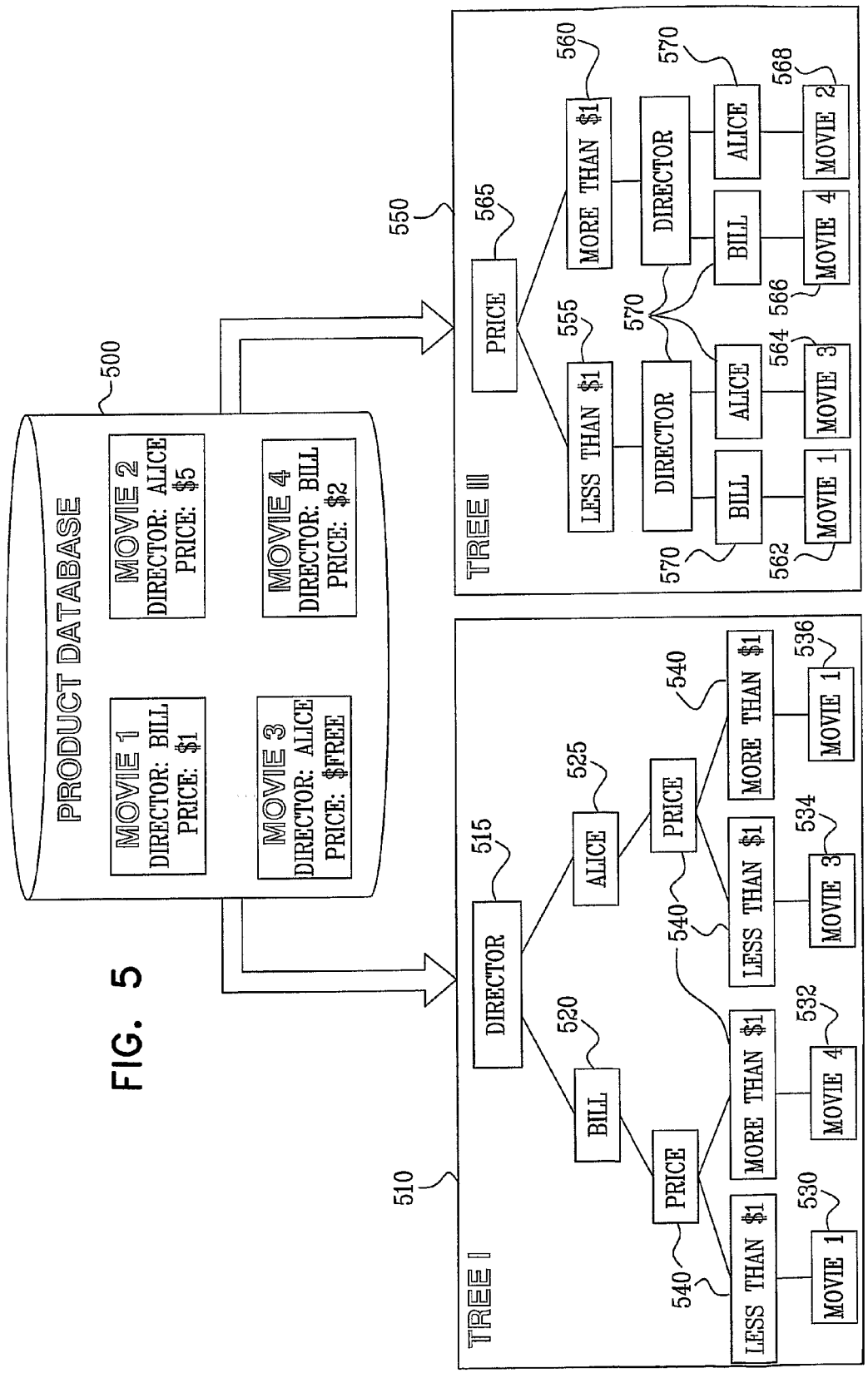
FIG. 5 is a simplified diagram depicting an exemplary multi-tree category hierarchy, useful for understanding FIG. 4.

Reference is now made to FIG. 5, which is a simplified diagram depicting an exemplary multi-tree category hierarchy, useful for understanding FIG. 4. For the purposes of discussion, suppose a product database 500 comprising four movies:

| | Movie: | | | |
|---|---|---|---|---|
| | 1 | 2 | 3 | 4 |
| Director | Bill | Alice | Alice | Bill |
| Price | $1 | $5 | Free | $2 |

Since two parameters, "Director" and "Price", are given for each movie in the product database 500, there are two possible tree category hierarchies. Tree I 510 depicts a first tree category hierarchy where database entries 520, 525 are first sorted according to a first parameter, "Director" 515. Then, in a lower level of the Tree I, database entries 530, 532, 534, 536 are sorted according to a second parameter, "Price" 540. Tree II 550 depicts a second tree category hierarchy where database entries 555, 560 are first sorted according to a first parameter, "Price" 565. Then, in a lower level of the Tree II, database entries 562, 564, 566, 568 are sorted according to a second parameter "Director" 570. The plurality of possible hierarchical organizations of products in a product database in tree forms is hereinafter termed a "multi-tree category hierarchy".

Returning to the discussion of FIG. 4, each viewer 60, 70 (FIG. 1) is associated with a viewer group by comparing a viewer associated rating log with ratings of each viewer group, and determining with which viewer group the viewer 60, 70 (FIG. 1) is most closely associated. One preferred method for determining the association of viewers with viewing groups is described in unpublished PCT patent application PCT/IL2006/001003 of NDS Ltd. For new viewers, when no sufficient viewing statistics have been collected, determining viewer affiliation with viewer group is preferably performed by comparison of a new viewer profile with group profile data, the group profile data determined from the matrix of groups of viewers by typical viewer profile parameters 390.

The VOD database of content items 410 is preferably clustered 420 according to the parameters determined from the matrix of viewers by products 320, the matrix of groups of viewers by groups of products 330, and the matrix of metadata relevance of program rating by groups of viewers 360, as described above. As a result of the clustering process, a program grid per viewer group 430 is determined. It is appreciated that the program grid per viewer group 430 comprises data used to create a display, for example and without limiting the generality of the foregoing, the displays of the EPGs of FIGS. 2A and 2B.

In parallel to the determination of the program grid per viewer group 430, each viewer profile 440 is examined during a viewer association process 450 with respect to the matrix of groups of viewers by groups of products 330 and the matrix of groups of viewers by typical viewer profile parameters 390. As a result of the viewer association process 450, a probability of affiliation of each viewer 60, 70 (FIG. 1) with viewer group 460 is determined.

An integrator 470 is operative to combine the program grid per viewer group 430 with the probability of affiliation of each viewer 60, 70 (FIG. 1) with viewer group 460, and individual viewing habits and viewing preferences 480, thereby determining a personalized EPG for each viewer 490.

Figure 6:
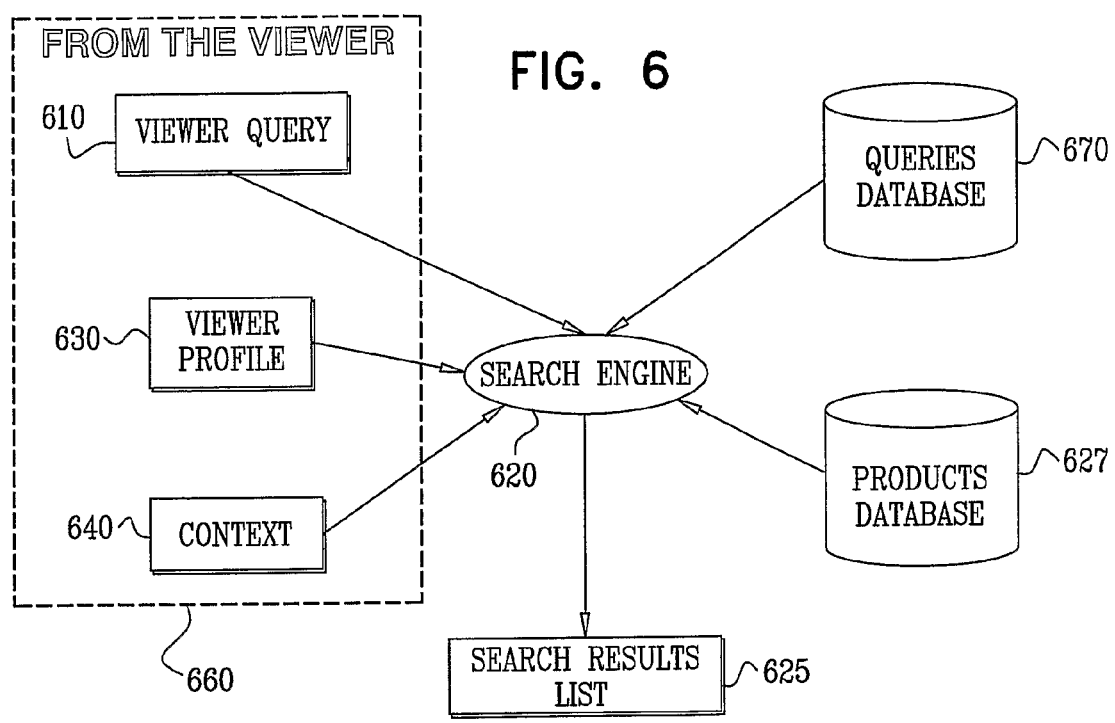
FIG. 6 is a simplified block diagram of a preferred workflow of personalized search and search results presentation, used in producing the EPG of FIGS. 2A and 2B.
Figure 7B:
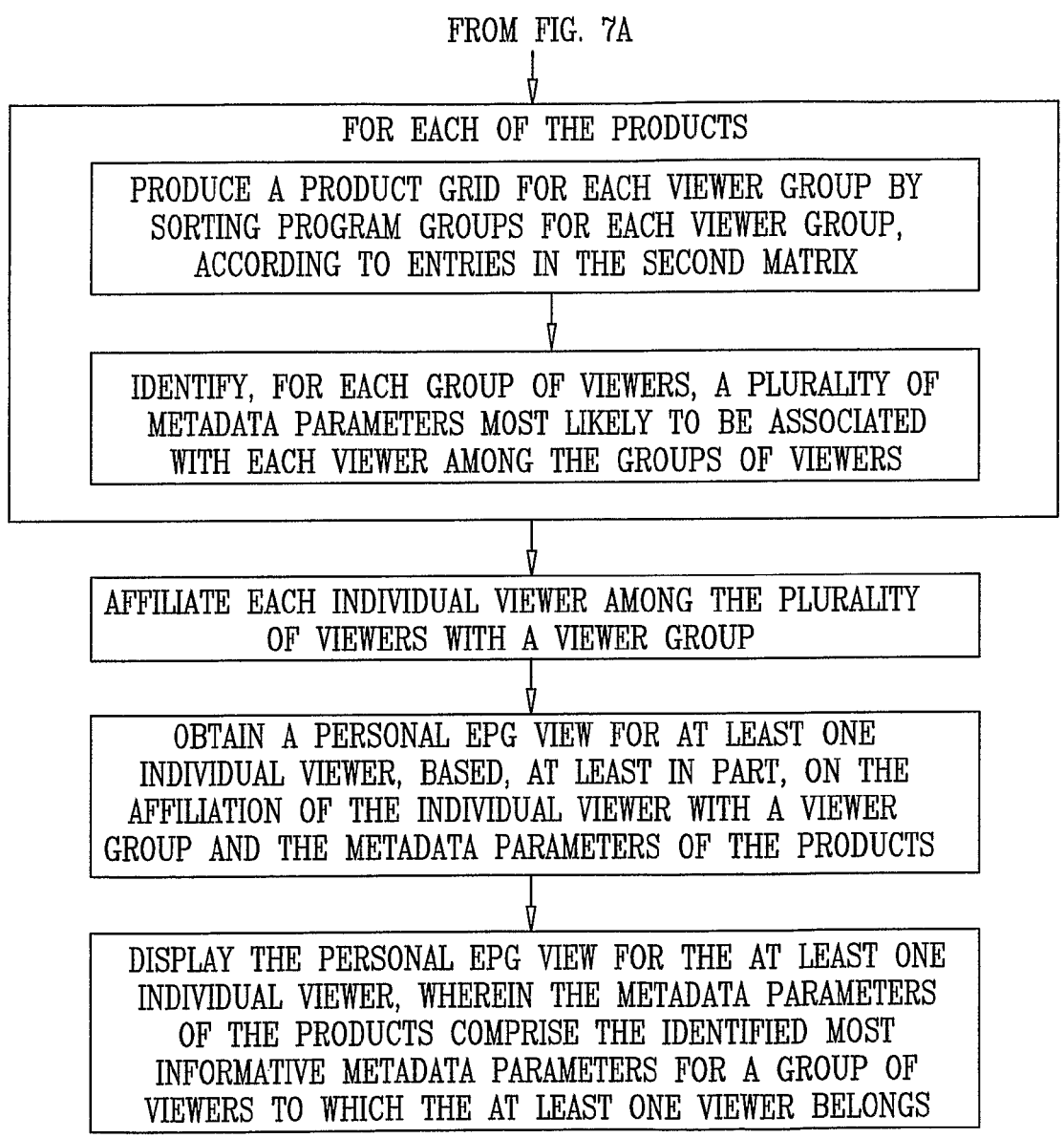

Reference is now made to FIG. 6, which is a simplified block diagram of a preferred workflow of personalized search and search results presentation, used in producing the EPG of FIGS. 2A and 2B. A viewer generated query 610 is inputted into a search engine 620. The search engine 620, generates a list of search results 625, and orders the results in light of additional inputs, explained below, to the search engine 620. The query 610 comprises a set of keywords, for example and without limiting the generality of the foregoing, a leading actor, a price, a length, and so forth. It is appreciated that in certain cases, such as music clips, the leading actor is replaced by an artist. Other appropriate keyword substitutions may occur, depending on products queried. It is appreciated that the query 610, when evaluated over a product database 627 returns a list which, typically, exceeds one viewing screen in length. The additional inputs, explained below, are utilized to pare down the list, and order the results in a manner which is meaningful to the viewer 60, 70 (FIG. 1).

A first additional input, viewer profile 630 comprises information about the viewer 60, 70 (FIG. 1) and the viewer's 60, 70 (FIG. 1) viewing habits. For example and without limiting the generality of the foregoing, if the viewer 60, 70 (FIG. 1) only watches content in Spanish, then, regardless of what the list of results of the query 610 comprises, all non-Spanish content may be deleted or placed well below a first screen of search results 625. Similarly, if the viewer profile 630 states that content with a restricted parental rating is not to be viewed, all content comprising such restricted parental ratings is preferably not displayed at all among the search results 625. Additional viewer profile information typically includes, but is not limited to subscription package, viewer age, viewer gender, location of television (kitchen, bedroom, den, etc.), number of viewers in a viewing household, and EPG themes, such as, but not limited to, background EPG color, EPG skins, and so forth.

A second additional input, context 640 comprises an environment from which the query 610 is run. For example and without limiting the generality of the foregoing, if the query 610 is run from a movies screen in the EPG, non-movies are preferably not displayed among the search results 625. Similarly, if the query 610 is run from a news screen in the EPG, content which does not comprise news is preferably not displayed among the search results 625. It is appreciated that context 640 may not always be present, or may be ambiguous, depending on how the viewer 60, 70 (FIG. 1) invoked the query 610. Furthermore, exact implementations of context 640 may vary. For example and without limiting the generality of the foregoing, context 640 may comprise additional keywords which are added to the query 610, but not by the viewer 60, 70 (FIG. 1), such as either "movie" or "news" in the two examples given above.

It is appreciated that the query 610, the viewer profile 630, and the context 640 are all viewer dependent 660 parameters.

A queries database 670 comprising a database of previous queries, in some preferred embodiments of the present invention is available, enabling data mining by the search engine 620 of previous queries. For instance, and without limiting the generality of the foregoing, a broadcaster or a content provider may find value in comparing what queries viewers 60, 70 (FIG. 1) run, and comparing that information with what products viewers 60, 70 (FIG. 1) actually view.

It is appreciated that the search query may be formulated by the viewer 60, 70 (FIG. 1) using any appropriate method, for example and without limiting the generality of the foregoing, using a remote control or using a keyboard, operative to communicate with the set top box 20, 30 (FIG. 1). Those skilled in the art will appreciate that a keyboard is not particularly suited for use in a television based environment. Alternatively, a refinement query, wherein the viewer 60, 70 (FIG. 1) selects keyword choices from a multi-tree category hierarchy may be formulated either ab-initio, such that the viewer 60, 70 (FIG. 1) formulates the query starting from a total view of the VOD product database, or the refinement query may be applied to an already partially existent query.

Alternatively, a query based on metadata, wherein, programs comprising metadata which matches, above a certain threshold, a presently watched program may be formulated. In formulating the metadata type query, the user preferably selects a particular metadata item or plurality of metadata items for searching. For example and without limiting the generality of the foregoing, the viewer 60, 70 (FIG. 1) may query for a same director, a same actor, a same studio, and so forth, as in the presently watched program.

In an alternative preferred embodiment of the present invention, comprises a "Watch Next" recommendation system. The "Watch Next" system of the present invention, in preferred embodiments thereof, preferably enables choosing content similar to presently viewed content by comparison of metadata associated with the presently viewed content to metadata of other content. Additionally, present invention, in preferred embodiments thereof, preferably enables choosing new content based on metadata—the new content being content for which there is little or no rating history, and are thus out of the scope of collaborative filtering, as described above, particularly with reference to FIG. 6.

Typically, there are four approaches taken in discussions concerning "Watch Next" recommendation systems:

1. determine a program (either recorded or presently being broadcast) which most closely resembles a most recently watched program, and recommend the program;
2. determine a candidate program (either recorded or presently being broadcast), the metadata of which most closely resembles one or two more significant metadata parameters of a most recently watched program. Compare the metadata of the candidate program and ensure that the remaining metadata parameters of the candidate program are also most dissimilar to corresponding metadata parameters of the most recently watched program;
3. determine, for each group of viewers, typical successions of program groups watched (for example and without limiting the generality of the foregoing, comedy after drama and horror movie after documentaries). Once the viewer 60, 70 (FIG. 1) is associated with a given group of viewers, it becomes possible to suggest a program from a next group of programs which would be typically watched by others members of the group with which the viewer 60, 70 (FIG. 1) is associated; and
4. learn the viewer's 60, 70 (FIG. 1) personal life cycle. For example and without limiting the generality of the foregoing, if the viewer 60, 70 (FIG. 1) typically watches a new program at 8:00 PM every day, then the new program is preferably among the "Watch Next" recommendations at 8:00 PM every day.

The use of any of the four techniques mentioned above, whether one is used independently of the other, or whether one is used in combination with at least one other, is referred to, hereinafter, as exploitation.

It is the opinion of the inventors of the present invention that method 1, determining the program which most closely resembles the most recently watched program is not likely to work, as people typically like variety. On the other hand, the inventors of the present invention are of the opinion that method 2, a partial comparison of metadata, ensuring differences should imitate diversity generated by associations and has a good potential to succeed.

It is appreciated that method 3, determining for each group of viewers, typical successions of program groups watched, requires collecting and processing additional statistics. Nevertheless, it is the opinion of the inventors of the present invention that method 3 has a high potential for success.

A new viewer, about whose viewing preferences nothing is known, poses a potential difficulty when attempting to offer a "Watch Next" recommendation. On the one hand, it is possible to suggest a top-rated program to the new viewer, but, by so doing, very little is learned about the new viewer's preferences. Utilization of a technique whereby top-rated programs are recommended to the viewer is referred to hereinafter as "exploitation".

Alternatively, it is possible to offer a random, possibly bizarre program to the new viewer. Typically, the viewer 60, 70 (FIG. 1) will not watch the randomly offered program. However, should the new viewer watch the randomly offered program, a lot is learned about the new viewer's viewing preferences. It is appreciated, however, that such an exploratory technique is typically not an efficient exploratory technique, as, more often than not, the new viewer will not view the offered random program.

By analyzing the matrix of viewers by products 320 (FIG. 3) and the matrix of groups of viewers by groups of products 330 (FIG. 3), it is possible to determine a group of programs for which odds of a typical viewer 60, 70 (FIG. 1) watching a member of the group of programs is approximately fifty-fifty. Typically, a program is chosen because existing ratings for that program show that the program is liked by about half of a viewing population and disliked by about half of the viewing population. By offering programs from the "fifty-fifty" group of programs, and observing new viewer choices, new viewer viewing preferences can, accordingly, be analyzed.

It is appreciated that viewer preferences are, by nature, dynamic. Viewer 60, 70 (FIG. 1) taste changes, and thus must never be considered fully learned by the system. On the other hand, it is desirable that the viewer 60, 70 (FIG. 1) trust the system and the recommendations of the system. Accordingly, it is preferable to construct "Watch Next" lists with a majority of content items suggested according to the exploitation method mentioned above, and a minority of content items suggested according to the at least one of the exploration methods mentioned above. For example and without limiting the generality of the foregoing, three top-rated content items may be offered in conjunction with one explorative type content offering.

It is appreciated that exploration may also preferably be used for offering both new and old programs, attempting, thereby, to identify potentially new audience groups. For example and without limiting the generality of the foregoing, the system may be designed to, on occasion, suggest a program to representatives from groups of people, wherein the groups of people to whom the program is offered comprise a "fifty-fifty" probability of liking the program. Occasionally offering such a program in such a fashion is preferably performed in order to determine if the tastes of the groups of viewers have changed.

Reference is now made to FIGS. 7A, 7B, 8A, 8B, and 9, which are simplified flowchart illustrations of preferred methods of operation of the system of FIG. 1, in accordance with preferred embodiments thereof. FIGS. 7A, 7B, 8A, 8B, and 9 are believed to be self explanatory with reference to the above discussion.

It is appreciated that software components of the present invention may, if desired, be implemented in ROM (read only memory) form. The software components may, generally, be implemented in hardware, if desired, using conventional techniques.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined only by the claims which follow:

What is claimed is:

1. A method for personalizing an electronic program guide (EPG), the method comprising:
    establishing a first matrix populated by ratings associated with a first plurality of v viewers in a content distribution system and a second plurality of p products each of which is a content item, the first matrix having dimensions v and p, each entry in the first matrix comprising either an empty entry or a rating indicating viewer interest in a content item;
    bi-clustering the first matrix, thereby producing a second matrix, the second matrix comprising a matrix of ratings comprising a grouping of the viewers according to similarity of products chosen by the viewers and a grouping of the products according to similarity of viewers who viewed the products;
    scoring metadata components associated with the products according to the matrix of ratings and producing a resulting score for each metadata component;
    establishing, based at least in part on the score for each metadata component, a third matrix, the third matrix comprising a matrix of groups of viewers according to metadata scores;
    establishing an auxiliary matrix of viewers according to viewer profile parameters, each entry in the auxiliary matrix indicating a viewer profile of an associated viewer and comprising a particular viewer profile parameter;
    grouping together matrix entries of viewers with similar viewer profile parameters in the auxiliary matrix, thereby producing a fourth matrix, the fourth matrix comprising a matrix of groups of viewers according to viewer profile parameters;
    for each of the products:
        producing a product grid for each viewer group by sorting program groups for each viewer group, according to entries in the second matrix; and
        identifying, for each group of viewers, a plurality of metadata parameters most likely to be associated with each viewer among the groups of viewers;
    affiliating each individual viewer among the plurality of viewers with a viewer group;
    obtaining a personal EPG view for at least one individual viewer, based, at least in part, on the affiliation of the individual viewer with a viewer group and the metadata parameters of the products; and
    displaying the personal EPG view for the at least one individual viewer,
    wherein the metadata parameters of the products comprise the identified most informative metadata parameters for a group of viewers to which the at least one viewer belongs.

2. The method according to claim 1 and wherein the rating comprises a measure of interest of at least one individual viewer in a product.

3. The method according to claim 2 and wherein the rating comprises a fraction, the fraction comprising a ratio of time the at least one individual viewer viewed the product to a total length of the product.

4. The method according to claim 1 and wherein the second matrix also comprises time-of-day information.

5. The method according to claim 1 and wherein the metadata components comprise:
    title;
    leading actor;
    leading actress;
    artist;
    director;
    viewing price;
    length;
    genre;
    country of production; and
    year of production.

6. The method according to claim 1 and wherein an unrated product is associated with rated products by determining which grouping of the products comprising rated products comprises metadata most closely matching metadata of the unrated product.

7. The method according to claim 6 and wherein the comparison of unrated product with rated products is performed giving different weights to different metadata parameters.

8. The method according to claim 7 and wherein the weighting of metadata parameters differs for different groups of viewers.

9. The method according to claim 8 and wherein the weight of metadata parameters is determined according to a statistical correlation of metadata parameter with program ratings within a given group of viewers.

10. The method according to claim 6 and wherein the unrated programs are associated with groups of viewers by cross-referencing the grouping of the products associated with the unrated product with groups of viewers in the second matrix, such that the associated groups of viewers comprise groups of viewers comprising high ratings for the grouping of the products associated with the unrated product.

11. The method according to claim 1 and wherein each viewer among the plurality of viewers is associated with one group of viewers by comparing ratings derived from a viewer associated viewing log with ratings of each viewer group, and associating each viewer with a group of viewers, such that the ratings of the associated group of viewers most closely resembles the ratings of the viewer.

12. A system for personalizing an electronic program guide (EPG), the system comprising:
   a first matrix populating unit, operative to populate a first matrix by ratings associated with a first plurality of v viewers in a content distribution system and a second plurality of p products each of which is a content item, the first matrix having dimensions v and p, each entry in the first matrix comprising either an empty entry or a rating indicating viewer interest in a content item;
   a bi-clustering unit, operative to bi-cluster the first matrix, thereby producing a second matrix, the second matrix comprising a matrix of ratings comprising a grouping of the viewers according to similarity of products chosen by the viewers and a grouping of the products according to similarity of viewers who viewed the products;
   a metadata scoring apparatus operative to score metadata components associated with the products according to the matrix of ratings and produce a resulting score for each metadata component;
   a third matrix establishing unit, operative to establish, based at least in part on the score for each metadata component, a third matrix, the third matrix comprising a matrix of groups of viewers according to metadata scores;
   an auxiliary matrix establishing unit, operative to establish an auxiliary matrix of viewers according to viewer profile parameters, each entry in the auxiliary matrix indicating a viewer profile of an associated viewer and comprising a particular viewer profile parameter;
   a matrix entry grouper operative to group together matrix entries of viewers with similar viewer profile parameters in the auxiliary matrix, thereby producing a fourth matrix, the fourth matrix comprising a matrix of groups of viewers according to viewer profile parameters;
   a processor, which, for each of the products:
      produces a product grid for each viewer group by sorting program groups for each viewer group, according to entries in the second matrix; and
      identifies, for each group of viewers, a plurality of metadata parameters most likely to be associated with each viewer among the groups of viewers;
   an affiliating unit which affiliates each individual viewer among the plurality of viewers with a viewer group;
   a personal EPG view producer operative to produce a personal EPG view for at least one individual viewer, based, at least in part, on the affiliation of the individual viewer with a viewer group and the metadata parameters of the products; and
   a display unit operative to display the personal EPG view for the at least one individual viewer,
   wherein the metadata parameters of the products comprise the identified most informative metadata parameters for a group of viewers to which the at least one viewer belongs.

13. A system for personalizing an electronic program guide (EPG), the system comprising:
   means for establishing a first matrix populated by ratings associated with a first plurality of v viewers in a content distribution system and a second plurality of p products each of which is a content item, the first matrix having dimensions v and p, each entry in the first matrix comprising either an empty entry or a rating indicating viewer interest in a content item;
   means for bi-clustering the first matrix, thereby producing a second matrix, the second matrix comprising a matrix of ratings comprising a grouping of the viewers according to similarity of products chosen by the viewers and a grouping of the products according to similarity of viewers who viewed the products;
   means for scoring metadata components associated with the products according to the matrix of ratings and producing a resulting score for each metadata component;
   means for establishing, based at least in part on the score for each metadata component, a third matrix, the third matrix comprising a matrix of groups of viewers according to metadata scores;
   means for establishing an auxiliary matrix of viewers according to viewer profile parameters, each entry in the auxiliary matrix indicating a viewer profile of an associated viewer and comprising a particular viewer profile parameter;
   means for grouping together matrix entries of viewers with similar viewer profile parameters in the auxiliary matrix, thereby producing a fourth matrix, the fourth matrix comprising a matrix of groups of viewers according to viewer profile parameters;
   means for processing each of the products, the means for processing comprising:
      means for producing a product grid for each viewer group by sorting program groups for each viewer group, according to entries in the second matrix; and
      means for identifying, for each group of viewers, a plurality of metadata parameters most likely to be associated with each viewer among the groups of viewers;
   means for affiliating each individual viewer among the plurality of viewers with a viewer group;
   means for obtaining a personal EPG view for at least one individual viewer, based, at least in part, on the affiliation of the individual viewer with a viewer group and the metadata parameters of the products; and
   means for displaying the personal EPG view for the at least one individual viewer,
   wherein the metadata parameters of the products comprise the identified most informative metadata parameters for a group of viewers to which the at least one viewer belongs.

* * * * *